(12) United States Patent
Ditzler

(10) Patent No.: US 11,021,239 B2
(45) Date of Patent: Jun. 1, 2021

(54) SHOCK STRUT SHRINKING SYSTEM

(71) Applicant: GOODRICH CORPORATION, Charlotte, NC (US)

(72) Inventor: Adam J. Ditzler, Fort Worth, TX (US)

(73) Assignee: GOODRICH CORPORATION, Charlotte, NC (US)

(*) Notice: Subject to any disclaimer, the term of this patent is extended or adjusted under 35 U.S.C. 154(b) by 133 days.

(21) Appl. No.: 16/425,591

(22) Filed: May 29, 2019

(65) Prior Publication Data
US 2020/0377201 A1 Dec. 3, 2020

(51) Int. Cl.
*B64C 25/60* (2006.01)
*B64C 25/12* (2006.01)

(52) U.S. Cl.
CPC ............. *B64C 25/60* (2013.01); *B64C 25/12* (2013.01)

(58) Field of Classification Search
CPC ......... B64C 25/10; B64C 25/12; B64C 25/60; B64C 2025/125
See application file for complete search history.

(56) References Cited

U.S. PATENT DOCUMENTS

| | | | | |
|---|---|---|---|---|
| 2,371,699 A * | 3/1945 | Martin | ..................... | B64C 25/22 244/102 A |
| 4,047,681 A * | 9/1977 | Hartel | ..................... | B64C 25/12 244/102 SS |
| 4,540,142 A * | 9/1985 | Veaux | ..................... | B64C 25/14 244/102 R |
| 4,556,179 A * | 12/1985 | Veaux | ..................... | B64C 25/22 244/102 A |
| 5,029,775 A * | 7/1991 | Abramovitsh | ..................... | B64C 25/20 244/102 R |
| 6,811,116 B1 * | 11/2004 | Briancourt | ..................... | B64C 25/20 244/100 R |
| 2013/0299631 A1 * | 11/2013 | Tucker | ..................... | B64C 25/26 244/102 R |
| 2015/0041268 A1 * | 2/2015 | Luce | ..................... | B64C 25/60 188/316 |

FOREIGN PATENT DOCUMENTS

GB 610698 10/1948

OTHER PUBLICATIONS

European Patent Office, European Search Report dated Jul. 6, 2020 in Application No. 19215605.7.

* cited by examiner

*Primary Examiner* — Philip J Bonzell
*Assistant Examiner* — Tye William Abell
(74) *Attorney, Agent, or Firm* — Snell & Wilmer LLP

(57) ABSTRACT

A system for shrinking landing gear includes a shock strut having a cylinder and a piston to be received by the cylinder. The system further includes an upper cam fastened to the piston and a lower cam fastened to the cylinder. The system further includes a brace configured to be coupled to the shock strut to lock the landing gear in a deployed position, and to fold towards the shock strut during retraction of the landing gear. The system further includes a collar coupled to the brace and the piston and configured to rotate relative to the cylinder in response to folding of the brace such that rotation of the collar rotates the piston and the upper cam relative to the lower cam, the rotation of the upper cam relative to the lower cam forcing the piston towards the aircraft attachment within the cylinder.

19 Claims, 3 Drawing Sheets

SHOCK STRUT SHRINKING SYSTEM

FIELD

The present disclosure relates to landing gear of aircraft and, more particularly, to a system for shrinking landing gear.

BACKGROUND

Many aircraft include landing gear having wheel assemblies to allow the aircraft to travel along the ground during taxi, takeoff, and landing. It may be desirable to reduce a storage space of landing gear within the aircraft in response to the landing gear being stowed in the aircraft. In particular, it may be desirable to reduce a length of the landing gear when the landing gear is stowed, such reduction in length being referred to as shrinking. A significant portion of the length of the landing gear may correspond to a shock strut, which includes a cylinder and a piston. Thus, it is desirable to reduce a length of a shock strut of landing gear when stowed.

SUMMARY

Disclosed herein is a system for use with landing gear having an aircraft attachment. The system includes a shock strut having a cylinder and a piston configured to be at least partially received by the cylinder. The system further includes an upper cam fastened to the piston. The system further includes a lower cam fastened to the cylinder. The system further includes a brace configured to be coupled to the shock strut in order to lock the landing gear in a deployed position, and to fold towards the shock strut during retraction of the landing gear. The system further includes a collar coupled to the brace and the piston and configured to rotate relative to the cylinder in response to folding of the brace such that rotation of the collar rotates the piston and the upper cam relative to the lower cam, the rotation of the upper cam relative to the lower cam forcing the piston towards the aircraft attachment within the cylinder.

Any of the foregoing embodiments may further include an upper bearing and a lower bearing each located radially between the piston and the cylinder such that the upper cam and the lower cam are located between the upper bearing and the lower bearing.

In any of the foregoing embodiments, the upper cam and the lower cam together operate as a spacer to separate the upper bearing from the lower bearing.

In any of the foregoing embodiments, the upper bearing is configured to be located closer to the aircraft attachment than the lower bearing in response to deployment of the landing gear, and the upper cam is configured to be located closer to the aircraft attachment than the lower cam.

In any of the foregoing embodiments, the system is configured for use in at least one of a main landing gear, a tail landing gear, or a nose landing gear.

Any of the foregoing embodiments may further include a torque arm configured to resist rotation between the collar and the piston in response to the landing gear being extended.

In any of the foregoing embodiments, the collar is coupled to the piston via the torque arm.

Any of the foregoing embodiments may further include a fastener configured to fasten the upper cam to the piston.

In any of the foregoing embodiments, the cylinder and the lower cam are both keyed together to resist rotation of the lower cam relative to the cylinder.

Also disclosed is a system for use with landing gear having an aircraft attachment. The system includes a shock strut having a cylinder and a piston configured to be at least partially received by the cylinder. The system further includes an upper cam fastened to the piston. The system further includes a lower cam fastened to the cylinder. The system further includes a brace configured to be coupled to the shock strut in order to lock the landing gear in a deployed position, and to fold towards the shock strut during retraction of the landing gear. The system further includes a collar coupled to the brace and the piston and configured to rotate relative to the cylinder in response to folding of the brace such that rotation of the collar rotates the piston and the upper cam relative to the lower cam, the rotation of the upper cam relative to the lower cam forcing the piston towards the aircraft attachment within the cylinder. The system further includes an upper bearing and a lower bearing each located radially between the piston and the cylinder such that the upper cam and the lower cam are located between the upper bearing and the lower bearing.

In any of the foregoing embodiments, the upper bearing and the lower bearing are configured to facilitate rotation of the piston within the cylinder.

In any of the foregoing embodiments, the upper cam and the lower cam together operate as a spacer to separate the upper bearing from the lower bearing.

In any of the foregoing embodiments, the upper bearing is configured to be located closer to the aircraft attachment than the lower bearing in response to deployment of the landing gear, and the upper cam is configured to be located closer to the aircraft attachment than the lower cam.

Any of the foregoing embodiments may further include a torque arm configured to resist rotation between the collar and the piston in response to the landing gear being extended.

In any of the foregoing embodiments, the collar is coupled to the piston via the torque arm.

Any of the foregoing embodiments may further include a fastener configured to fasten the upper cam to the piston.

In any of the foregoing embodiments, the cylinder and the lower cam are both keyed together to resist rotation of the lower cam relative to the cylinder.

Also disclosed is a system for use with landing gear having an aircraft attachment. The system includes a shock strut having a cylinder and a piston configured to be at least partially received by the cylinder. The system further includes an upper cam fastened to the piston. The system further includes a lower cam fastened to the cylinder. The system further includes a brace configured to be coupled to the shock strut in order to lock the landing gear in a deployed position, and to fold towards the shock strut during retraction of the landing gear. The system further includes a torque arm coupled to the piston and configured to resist rotation between the collar and the piston in response to the landing gear being extended. The system further includes a collar coupled to the brace and the torque arm and configured to rotate relative to the cylinder in response to folding of the brace such that rotation of the collar rotates the piston and the upper cam relative to the lower cam, the rotation of the upper cam relative to the lower cam forcing the piston towards the aircraft attachment within the cylinder.

Any of the foregoing embodiments may further include an upper bearing and a lower bearing each located radially between the piston and the cylinder such that the upper cam and the lower cam are located between the upper bearing and the lower bearing, wherein the upper cam and the lower cam together operate as a spacer to separate the upper bearing from the lower bearing.

Any of the foregoing embodiments may further include a fastener configured to fasten the upper cam to the piston, wherein the cylinder and the lower cam are both keyed together to resist rotation of the lower cam relative to the cylinder.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
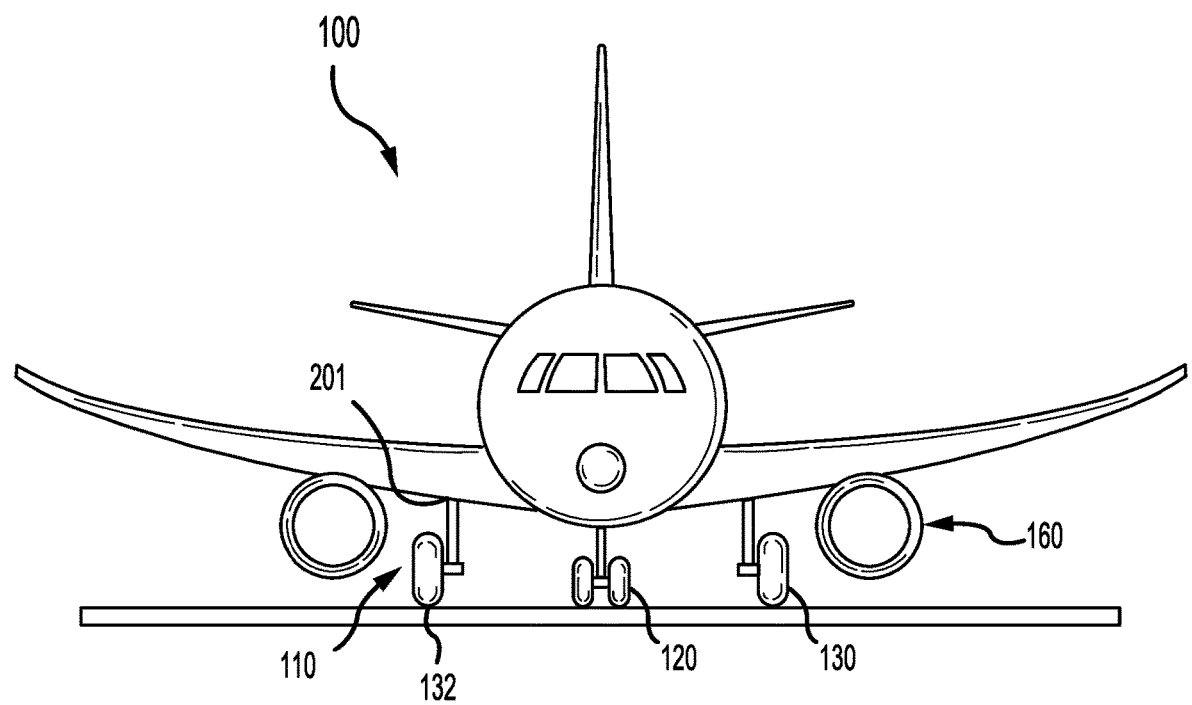
FIG. 1 illustrates an aircraft having multiple landing gear, in accordance with various embodiments.

Referring now to FIG. 1, an aircraft 100 in accordance with various embodiments can include multiple landing gear including a first landing gear 110, a second landing gear 120, and a third landing gear 130. In various embodiments, the first landing gear 110 and the third landing gear 130 may be main landing gear and the second landing gear 120 may be a nose landing gear. Each landing gear may include one or more wheel assemblies. For example, the first landing gear 110 includes a wheel assembly 132. The landing gear 110, 120, 130 and the wheel assembly 132 support the aircraft 100 in response to the aircraft 100 being parked and during taxi, takeoff, and landing of the aircraft 100.

The aircraft 100 may further include one or more gas turbine engine 160. The gas turbine engine 160 may be controlled by a pilot (such as by controlling a throttle in a cockpit) to generate thrust to accelerate the aircraft 100.

Figure 2A:
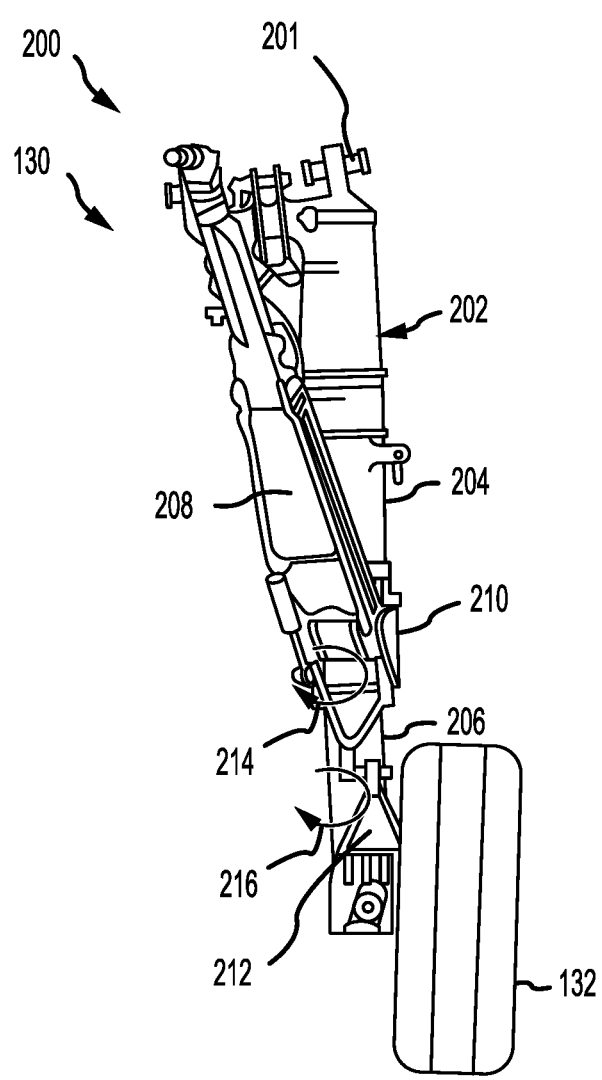
FIG. 2A illustrates a deployed landing gear that includes a system for shrinking the landing gear, in accordance with various embodiments.
Figure 2B:
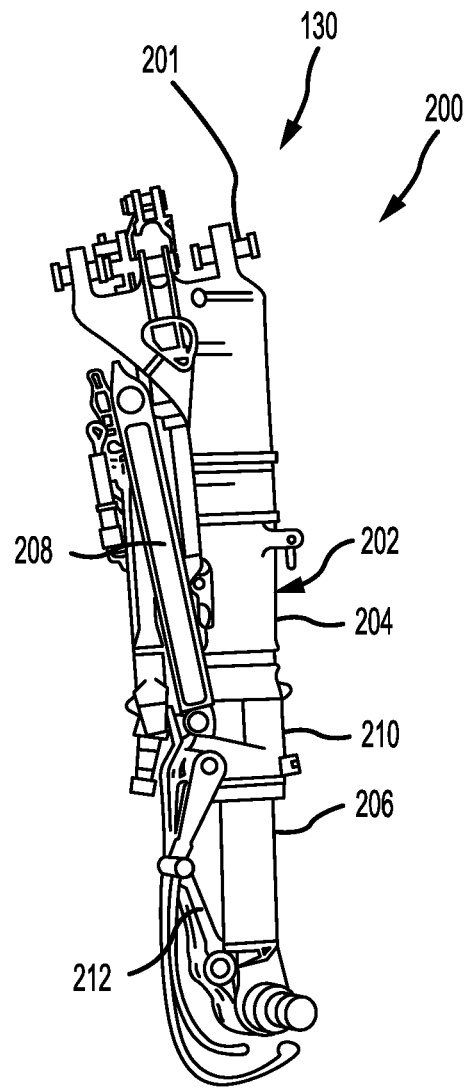
FIG. 2B illustrates the landing gear of FIG. 2A in a retracted position, in accordance with various embodiments.

Referring now to FIGS. 2A and 2B, the landing gear 130 may include a system 200 for shrinking the landing gear 130. Referring briefly to FIGS. 1, 2A, and 2B, the landing gear 130 may be coupled to the aircraft 100 via an aircraft attachment 201. Although the system 200 is shown included in the third landing gear 130, a similar system may also or instead be included in one or more of the first landing gear 110 or the second landing gear 120. FIG. 2A illustrates the landing gear 130 in a deployed, or extended, position and FIG. 2B illustrates the landing gear 130 in a retracted, or stowed, position (with the wheel and tire removed in the drawing for clarity).

Returning reference to FIGS. 2A and 2B, the system 200 includes a shock strut 202 that is designed to absorb a shock experienced by the wheel assembly 132, such as in response to the wheel assembly 132 rolling over a rough runway or in response to a landing event. The shock strut 202 includes a cylinder 204 and a piston 206 designed to at least partially be received by the cylinder 204. In that regard, the piston 206 may translate within and relative to the cylinder 204. The shock strut 202 may further include a mechanism, such as oil, designed to absorb the shock as the piston 206 translates into the cylinder 204.

The system 200 may further include a brace linkage 208 which may include one or more brace link. The brace linkage 208 may be coupled to a lower portion of the shock strut 202 (e.g., a location of the shock strut 202 that is located distal to the aircraft 100 of FIG. 1) and to a portion of an airframe of the aircraft 100 of FIG. 1. The brace linkage 208 may lock the landing gear 130 in a deployed position until a landing gear retraction is commanded.

The system 200 may also include a collar 210. The collar 210 may be coupled to the brace linkage 208 and to the piston 206, and may facilitate folding of the brace linkage 208, as discussed further below.

The system 200 may also include a set of torque arms 212. The torque arms 212 may be coupled to the piston 206 and the collar 210 and may resist rotation of the piston 206 relative to the collar 210 in response to the landing gear 130 being in the deployed position.

Figure 3:
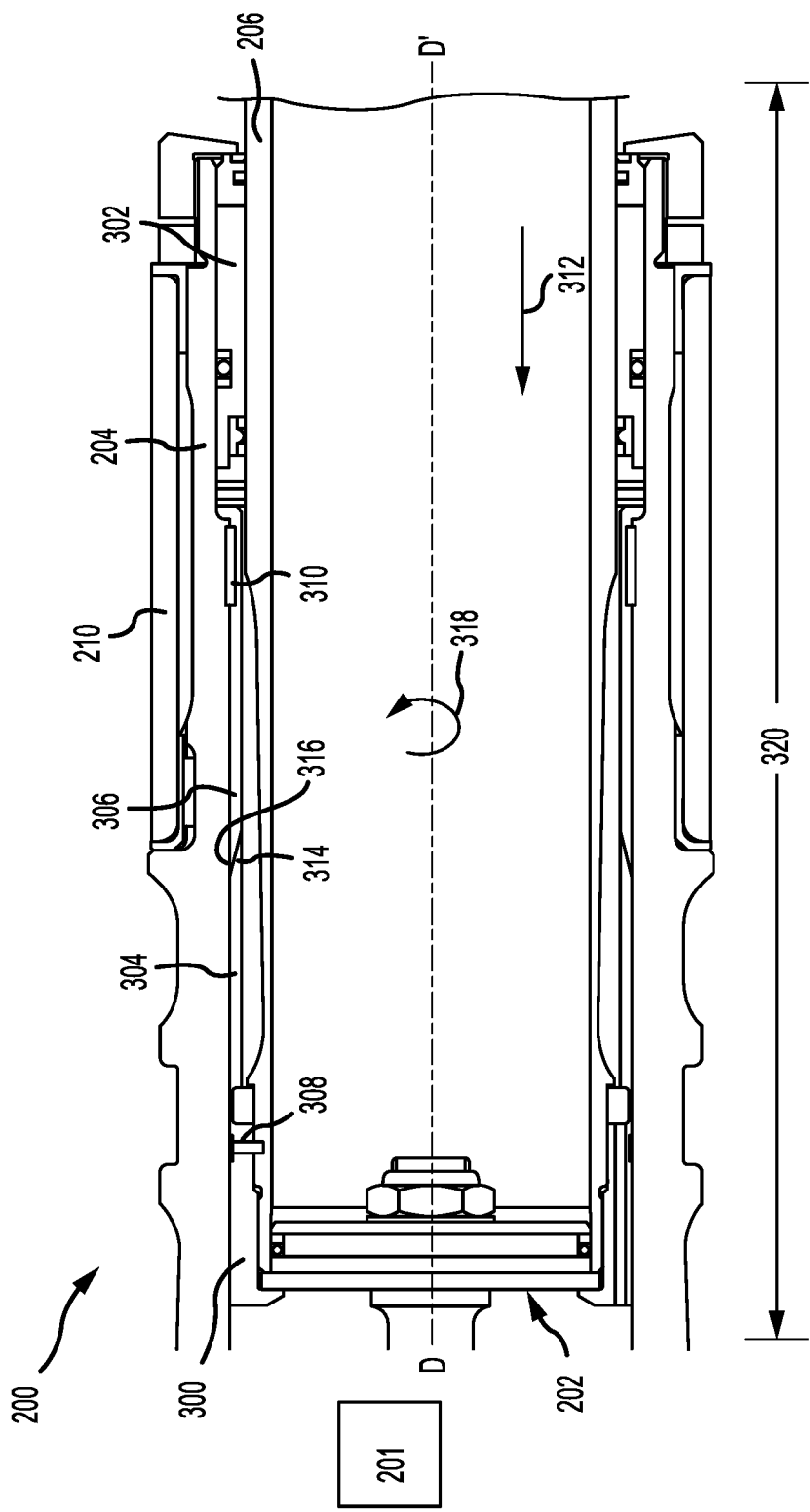
FIG. 3 illustrates an enlarged view of a portion of the landing gear of FIG. 2A including features of the system of FIG. 2A, in accordance with various embodiments.

Referring to FIGS. 2A, 2B, and 3, the system 200 may further include an upper bearing 300 and a lower bearing 302. The upper bearing 300 and the lower bearing 302 may each be located radially between the piston 206 and the cylinder 204 and may reduce friction during rotation or lateral translation of the piston 206 relative to the cylinder 204. The upper bearing 300 may be located on an upper portion of the piston 206 and the lower bearing 302 may be located on a lower portion of the shock strut 202. That is, the upper bearing 300 may be located closer to the aircraft attachment 201 than the lower bearing 302 in response to deployment of the landing gear 130.

The system 200 may also include an upper cam 304 and a lower cam 306. The upper cam 304 may be located closer to the aircraft attachment 201 than the lower cam 306 in response to deployment of the landing gear 130. In various embodiments, the upper cam 304 may be formed separately, integrally, or monolithically with the upper bearing 300. In various embodiments, the lower cam 306 may be formed separately, integrally, or monolithically with the lower bearing 302.

The upper cam 304 may be fastened to the piston 206, such as by use of a fastener 308. The lower cam 306 may be coupled to the cylinder 204 in such a way as to resist rotation of the lower cam 306 relative to the cylinder 204, such as by use of keys 310. In that regard, the lower cam 306 and the cylinder 204 may each be keyed or include other features, such as splines, that resist rotation of the lower cam 306 relative to the cylinder 204.

It is desirable to increase storage space in the aircraft 100. Such storage space may be used to store extra fuel or features. In that regard, it is desirable to decrease storage space of the landing gear 130 in the aircraft 100. The features of the system 200 facilitate shrinking of the landing gear 130 by translating the piston 206 and the wheel assembly 132 (and any corresponding tire) towards the aircraft attachment 201 within the cylinder 204.

During stowing of the landing gear 130, an actuator actuates, or folds, the brace linkage 208 towards the shock strut 202. This folding action of the brace linkage 208 "unlocks" the landing gear 130, allowing it to be stowed. This folding action results in rotation of the collar 210 (as shown by an arrow 214) due to the coupling of the brace linkage 208 to the collar 210. Because the piston 206 is coupled to the collar 210 via the torque arms 212, rotation of the collar 210 causes rotation of the piston 206 (as shown by an arrow 216). In various embodiments, a degree of rotation of the piston 206 during retraction is equal to a degree of rotation of the collar 210. For example, the piston 206 and the collar 210 may each rotate during a full retraction between 50 degrees (50°) and 150°, between 60° and 110°, or between 70° and 100°, although one skilled in the art will realize that the piston 206 and the collar 210 may rotate any amount so long as corresponding cams can accommodate such rotation.

Due to the fastening of the piston 206 to the upper cam 304, rotation of the piston 206 (about an axis D-D', in a direction shown by an arrow 318) results in a similar rotation of the upper cam 304. That is, a degree of rotation of the upper cam 304 may equal a degree of rotation of the piston 206. Due to the anti-rotation features between the cylinder 204 and the lower cam 306, the lower cam 306 fails to rotate with the upper cam 304. That is, the upper cam 304 is free to rotate relative to the lower cam 306. In response to rotation of the upper cam 304 relative to the lower cam 306, a lobe 314 of the upper cam 304 presses against a lobe 316 of the lower cam 306, thus forcing additional separation of the upper bearing 300 and the lower bearing 302. This forced additional separation translates the piston 206 farther into the cylinder 204 in a direction shown by an arrow 312.

This translation of the piston 206 into the cylinder 204 reduces a length 320 of the shock strut 202, thus freeing up valuable space in the aircraft 100. For example, the system 200 may reduce the length 320 of the shock strut 202 (in response to the landing gear 130 being stowed) by between 1 inch and 10 inches (25.4 millimeters (mm) and 254 mm), between 1 inch and 7 inches (25.4 mm and 177.8 mm), or between 2 inches and 4 inches (50.8 mm and 101.6 mm).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for use with landing gear having an aircraft attachment, the system comprising:
   a shock strut having a cylinder and a piston configured to be at least partially received by the cylinder;
   an upper cam fastened to the piston;
   a lower cam fastened to the cylinder;
   a brace configured to be coupled to the shock strut in order to lock the landing gear in a deployed position, and to fold towards the shock strut during retraction of the landing gear;
   a collar coupled to the brace and the piston and configured to rotate relative to the cylinder in response to folding of the brace such that rotation of the collar rotates the piston and the upper cam relative to the lower cam, the rotation of the upper cam relative to the lower cam forcing the piston towards the aircraft attachment within the cylinder; and an upper bearing and a lower bearing each located radially between the piston and the cylinder such that the upper cam and the lower cam are located between the upper bearing and the lower bearing.

2. The system of claim 1, wherein the upper cam and the lower cam together operate as a spacer to separate the upper bearing from the lower bearing.

3. The system of claim 1, wherein the upper bearing is configured to be located closer to the aircraft attachment than the lower bearing in response to deployment of the landing gear, and the upper cam is configured to be located closer to the aircraft attachment than the lower cam.

4. The system of claim 1, wherein the system is configured for use in at least one of a main landing gear, a tail landing gear, or a nose landing gear.

5. The system of claim 1, further comprising a fastener configured to fasten the upper cam to the piston.

6. The system of claim 1, wherein the cylinder and the lower cam are both keyed together to resist rotation of the lower cam relative to the cylinder.

7. The system of claim 1, further comprising a torque arm configured to resist rotation between the collar and the piston in response to the landing gear being extended.

8. The system of claim 7, wherein the collar is coupled to the piston via the torque arm.

9. A system for use with landing gear having an aircraft attachment, the system comprising:
a shock strut having a cylinder and a piston configured to be at least partially received by the cylinder and to translate within and relative to the cylinder;
an upper cam fastened to the piston;
a lower cam fastened to the cylinder;
a brace configured to be coupled to the shock strut in order to lock the landing gear in a deployed position, and to fold towards the shock strut during retraction of the landing gear;
a collar coupled to the brace and the piston and configured to rotate relative to the cylinder in response to folding of the brace such that rotation of the collar rotates the piston and the upper cam relative to the lower cam, the rotation of the upper cam relative to the lower cam forcing the piston towards the aircraft attachment within the cylinder; and
an upper bearing and a lower bearing each located radially between the piston and the cylinder such that the upper cam and the lower cam are located between the upper bearing and the lower bearing.

10. The system of claim 9, wherein the upper bearing and the lower bearing are configured to facilitate rotation of the piston within the cylinder.

11. The system of claim 9, wherein the upper cam and the lower cam together operate as a spacer to separate the upper bearing from the lower bearing.

12. The system of claim 9, wherein the upper bearing is configured to be located closer to the aircraft attachment than the lower bearing in response to deployment of the landing gear, and the upper cam is configured to be located closer to the aircraft attachment than the lower cam.

13. The system of claim 9, further comprising a fastener configured to fasten the upper cam to the piston.

14. The system of claim 9, wherein the cylinder and the lower cam are both keyed together to resist rotation of the lower cam relative to the cylinder.

15. The system of claim 9, further comprising a torque arm configured to resist rotation between the collar and the piston in response to the landing gear being extended.

16. The system of claim 15, wherein the collar is coupled to the piston via the torque arm.

17. A system for use with landing gear having an aircraft attachment, the system comprising:
a shock strut having a cylinder and a piston configured to be at least partially received by the cylinder;
an upper cam fastened to the piston;
a lower cam fastened to the cylinder;
a brace configured to be coupled to the shock strut in order to lock the landing gear in a deployed position, and to fold towards the shock strut during retraction of the landing gear;
a torque arm coupled to the piston and configured to resist rotation between the collar and the piston in response to the landing gear being extended;
a collar coupled to the brace and the torque arm and configured to rotate relative to the cylinder in response to folding of the brace such that rotation of the collar rotates the piston and the upper cam relative to the lower cam, the rotation of the upper cam relative to the lower cam forcing the piston towards the aircraft attachment within the cylinder; and
an upper bearing and a lower bearing each located radially between the piston and the cylinder such that the upper cam and the lower cam are located between the upper bearing and the lower bearing.

18. The system of claim 17, wherein the upper cam and the lower cam together operate as a spacer to separate the upper bearing from the lower bearing.

19. The system of claim 17, further comprising a fastener configured to fasten the upper cam to the piston, wherein the cylinder and the lower cam are both keyed together to resist rotation of the lower cam relative to the cylinder.

* * * * *